(12) United States Patent
Hurst

(10) Patent No.: US 10,730,570 B2
(45) Date of Patent: Aug. 4, 2020

(54) ENHANCED VEHICLE EFFICIENCY USING AIRFOIL TO RAISE REAR WHEELS ABOVE ROAD SURFACE

(71) Applicant: Autaero LLC, Powell, OH (US)

(72) Inventor: J. Douglas Hurst, Powell, OH (US)

(73) Assignee: Autaero LLC, Powell, OH (US)

( * ) Notice: Subject to any disclaimer, the term of this patent is extended or adjusted under 35 U.S.C. 154(b) by 225 days.

(21) Appl. No.: 15/958,469

(22) Filed: Apr. 20, 2018

(65) Prior Publication Data

US 2019/0322324 A1    Oct. 24, 2019

(51) Int. Cl.
*B62D 35/00*    (2006.01)
*B62D 37/02*    (2006.01)

(52) U.S. Cl.
CPC ........... *B62D 35/007* (2013.01); *B62D 37/02* (2013.01)

(58) Field of Classification Search
CPC .............................. B62D 37/02; B62D 35/007
USPC ............................................ 296/180.1, 180.5
See application file for complete search history.

(56) References Cited

U.S. PATENT DOCUMENTS

| | | | | |
|---|---|---|---|---|
| 1,895,750 A * | 1/1933 | Brown | ................... | B60G 99/00 180/89.1 |
| 2,923,494 A * | 2/1960 | Strong | ................... | B62D 57/04 244/2 |
| 3,455,594 A * | 7/1969 | Mrlik | ................... | B60G 99/00 296/180.5 |
| 5,129,699 A | 7/1992 | De Angeli | | |
| 5,146,203 A * | 9/1992 | Simuni | ............... | B60C 23/0493 123/537 |
| 5,908,217 A | 6/1999 | Englar | | |
| 6,338,524 B1 | 1/2002 | Wu | | |
| 7,517,004 B2 * | 4/2009 | Honeycutt | ........... | B62D 35/007 296/180.1 |
| 8,678,475 B2 * | 3/2014 | Goenueldinc | ........ | B62D 35/007 296/180.5 |
| 8,740,285 B2 | 6/2014 | Beckon | | |

(Continued)

FOREIGN PATENT DOCUMENTS

| | | |
|---|---|---|
| CN | 1304845 A | 7/2001 |
| CN | 101104421 A | 1/2008 |

(Continued)

OTHER PUBLICATIONS

J. Sita Priyadarshini, et al., Use of Aerodynamic Lift in Increasing the Fuel Efficiency of Heavy Vehicles, journal, Jul.-Aug. 2015, pp. 39-42, vol. 12—Issue 4, OSR Journal of Mechanical and Civil Engineering (IOSR-JMCE), India.

*Primary Examiner* — Pinel E Romain
(74) *Attorney, Agent, or Firm* — Jason H. Foster; Kremblas & Foster

(57) ABSTRACT

A vehicle with a body, two front wheels and at least one rear wheel. An airfoil is mounted to the body with adjustability in angle of attack, and at least one of the front wheels is driven to permit acceleration to a cruise speed at which the airfoil provides sufficient lift to raise the rear wheel off the road while the front wheels maintain contact with the road. Lift may be modified by at least modifying velocity and modifying the angle of attack of the airfoil. This vehicle provides advantages in comfort and efficiency due to reduced friction in contact with the road and imperfections on the road. The wing may also be adjusted to increase downward force on the rear wheel.

14 Claims, 6 Drawing Sheets

(56) References Cited

U.S. PATENT DOCUMENTS

| | | | | |
|---|---|---|---|---|
| 8,757,700 | B2* | 6/2014 | Hicks | B62D 37/02 |
| | | | | 296/180.1 |
| 10,189,513 | B2* | 1/2019 | Heil | B62D 35/00 |
| 2011/0169298 | A1* | 7/2011 | Goenueldinc | B62D 35/007 |
| | | | | 296/180.1 |
| 2018/0043946 | A1* | 2/2018 | Barber | B62D 35/007 |
| 2019/0100194 | A1* | 4/2019 | Fahland | B60W 30/02 |

FOREIGN PATENT DOCUMENTS

| | | |
|---|---|---|
| CN | 101947981 A | 1/2011 |
| CN | 201849546 U | 6/2011 |
| CN | 203544232 U | 4/2014 |
| CN | 104627257 A | 5/2015 |
| CN | 204452640 U | 7/2015 |
| GB | 2212117 A | 7/1989 |
| IN | 1356/MUM/2012 A | 6/2013 |
| JP | 2009208657 A | 9/2009 |
| KR | 20130042383 A | 4/2013 |

\* cited by examiner

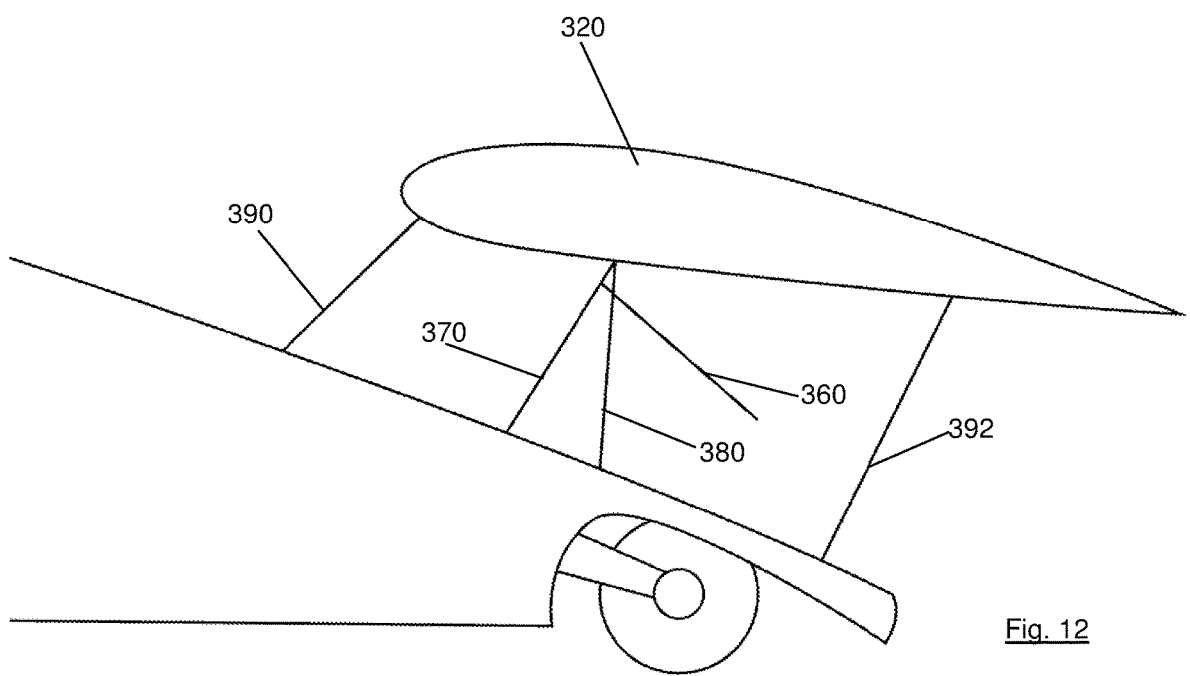

ENHANCED VEHICLE EFFICIENCY USING AIRFOIL TO RAISE REAR WHEELS ABOVE ROAD SURFACE

BACKGROUND OF THE INVENTION

The invention relates generally to vehicles, and more specifically to ground-based vehicles used for human transport.

Personal transportation takes many forms and has existed since prehistoric times. Beasts of burden have transported humans and cargo for millennia and in the past century machines have replaced animals as vehicles. Wheeled vehicles include wagons, bicycles and automobiles, and such vehicles have two or more wheels in contact with the ground while in motion. Three or more wheels are required for stability while stationary, and so most modern vehicles for human transportation have three or more wheels.

One disadvantage of a vehicle with three or four wheels is that every wheel in contact with the ground increases the rolling friction, along with wind resistance, of the vehicle. Furthermore, each wheel encounters, and transfers to the vehicle, shock forces when the wheel contacts something other than a smooth road. Bumps and holes in roads upon which the vehicle's wheels roll interrupt the round wheel rolling along the planar road surface, thereby causing discomfort and possibly damage to the vehicle, passengers and cargo. Although virtually every modern vehicle uses a passive and/or active suspension to connect its wheels to the vehicle's body, bumps and holes in roads still create sudden forces that are transmitted to the contents of the vehicle's body.

Existing technology has attempted to address some of the problems with conventional wheeled vehicles. For example, U.S. Pat. No. 8,757,700 discloses a wing on the roof of a vehicle for the purpose of creating lift to reduce the effective weight of the vehicle. Lift and drag are produced when a fluid flows over a wing. Other patents referred to by Applicant have related structures and/or mechanisms. However, none capably addresses the shortfall of efficiency and comfort from which conventional vehicles suffer.

BRIEF SUMMARY OF THE INVENTION

Described herein is a ground-based, winged vehicle having a body in which a person is enclosed during movement. The vehicle may have at least two ground-engaging wheels in the front, at least one rear ground-engaging wheel in the rear, and an air foil, such as a wing, mounted to the upper part of the body near the rear of the vehicle. The rear ground-engaging wheel may be centrally located relative to the vehicle, and in an alternative embodiment two rear wheels are on a single axis of rotation and may be aligned with, or closer together than, the front wheels.

The wing may be a symmetric or asymmetric wing, and is designed to create lift sufficient to raise the rear wheel or wheels from the ground at a cruising speed, which may be typical highway speeds. As an example, a typical highway speed may be at or near the speed limit. When the lift is sufficient, the rear of the vehicle may be suspended in the air. The vehicle is "suspended" when the front wheels maintain road contact and the rear wheel or wheels of the vehicle make no contact with the road surface upon which the vehicle is travelling for an extended distance, such as about one mile or many miles. The reduced wheel friction resulting from a lack of contact with the road may increase fuel efficiency over conventional vehicles, and may increase comfort for the occupant(s) of the vehicle.

The wing may be mounted to the vehicle body at a pivot with an assembly that causes or permits the wing's pitch (angle of attack) to be changed. Thus, the wing has an angle of attack that may be adjusted by applying a force to the wing or a connected structure in order to cause rotation about the pivot. The angle of attack may be adjusted automatically, using sensors that signal a computer or other logic circuit, and/or the angle may be adjusted manually by the driver or a passenger. The controls may alter the pitch of the wing from approximately 60 degrees positive to approximately 40 degrees negative.

The wing's pivot axis may be positioned on or near the wing's aerodynamic center, commonly considered to be the 25% chord position. This may cause the wing to automatically adjust its angle of attack, without any controls rotating the wing, due only to changes in relative air speed. By utilizing the wing's pivot axis, the wing may generate an efficient lift-to-drag ratio with a forwardly-directed apparent wind at or in excess of cruise speed, and when the vehicle is at rest or is travelling at a slower speed, gravity and the position of the hinged connection relative to wing center of mass may cause the trailing edge of the wing to be low (e.g., high positive angle of attack) due to gravity. This configuration may prevent or mitigate high wind from the rear of vehicle uplifting the wing.

The wing is an airfoil that creates lift on the attached vehicle. By adjusting the pitch of the wing, sufficient lift is created to raise the rear wheel(s) to enhance efficiency and comfort. The vehicle raises the rear wheel(s) above the road surface when the lift conditions are sufficient, thereby reaching an increased level of vehicle efficiency. The vehicle suspends the rear wheel(s) above the road surface to reduce friction with the road surface and improve ride quality by reducing the number of wheels contacting the ground. The cruise speed is contemplated as 50 to 120 miles per hour (mph), with a preferred cruise speed in a range between 60-90 mph, and a most preferred cruise speed of about 65-80 mph. These are the desired suspending speeds when the road is straight and level. However, numerous conditions, including negotiating turns on the road and the frequency of initiating and ending suspending, could suggest that suspending is undesirable, for example due to possible loss of efficiency or control.

The preferred vehicle body capacity is a two person seated side-by-side and enclosed with doors and a roof. An enclosed body means the occupants of the vehicle are not exposed directly to the air through which the vehicle is being driven. Nevertheless, the vehicle disclosed herein may be an open air vehicle, such as a convertible, motorcycle or any other unique vehicle, including those known by the HONDA, VANDERHALL and CAN-AM/BRP brands.

BRIEF DESCRIPTION OF THE SEVERAL VIEWS OF THE DRAWINGS

FIG. 12 is an enlarged side view illustrating the rear of the embodiment of FIG. 11.

Figure 1:
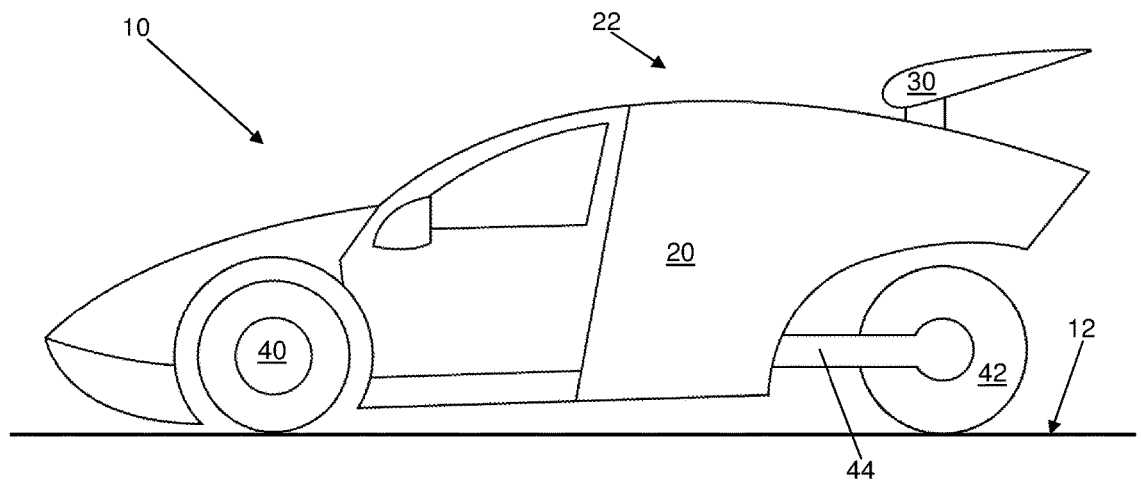
FIG. 1 is a side schematic view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

A vehicle 10 that may operate according to the invention is shown in FIG. 1. The vehicle 10 has a body 20 with an upper body surface, which may be a roof 22, and an airfoil, such as the wing 30, attached to the rear section of the body. The wing 30 may be attached to vehicle 10 by any conventional means, such as one or more rigid posts 34 that securely mount to, or are integral with, an upper body structure of the vehicle 10. Alternative mounting structures include, without limitation, brackets, beams, poles, cables, and any other structures that do not interfere excessively with the aerodynamic features of the wing 30 as described herein.

The wing 30 may be a conventional, preferably asymmetric (about a chord line) airfoil that is attached to the posts 34 in such a manner that, during movement of the vehicle 10 along the ground, the air passing over the wing 30 and body 20 causes lift. The wing may be stabilized so the air flowing along it produces insufficient force to move the wing 30 relative to the body 20 when not intended. The attachment may prevent movement between the wing 30 and the posts 34 under any circumstances short of fracture or damage, or the attachment may include a structure that permits relative movement. A structure that permits relative movement may be a pivot, such as an axle 32 shown in FIG. 2, which is a rod that extends through the posts 34 and the wing 30. The axle 32 may be replaced by any other bearing that permits pivoting of the wing 30 about the pitch axis of the axle 32, so that the angle of the wing 30 may be adjusted relative to the body 20. Such adjustment permits the angle of attack (the angle of the wing's chord line relative to the air flow) to be modified.

The wing 30 may be made of any conventional material used for airfoils, including aluminum or fiber-reinforced polymers, such as carbon fiber. In one embodiment, the wing is made of stiff polymeric foam covered with a rigid coating, which may be a thermosetting epoxy. In other embodiments, the wing may be made of any suitable lightweight material. The wing is preferably waterproof.

The axle 32 may be a rigid steel rod, but may be any other structure that permits rotation of the wing to adjust the pitch or angle of attack. The wing 30 may be mounted to the body 20 by another means that permits the angle of attack of the wing 30 to be modified. In one embodiment, the wing 30 may have a pair of tongues (not shown) extending laterally from each opposing, laterally-extending end of the wing 30. These tongues may extend into panels attached to the body 20 that extend upwardly at opposite ends of the wing 30. The panels may have arcuate slots that receive the tongues extending from the wing ends. In this configuration, the slots may permit the wing to change angle as the tongues slide in the arcuate slots, during which sliding the wing translates fore and aft of the vehicle. This alternative is but one of many means, other than the axle 32, by which the wing 30 may change angle of attack relative to the body 20.

In one embodiment, adjustment of the wing 30 may be effected by a prime mover, such as a servomotor (not shown), that is drivingly linked to the axle 32. The driving link from the servomotor to the axle 32 may be a chain, cable, belt cable or any other similar structure if the servomotor is housed within the body of the vehicle. In this embodiment, upon rotation of the drive shaft of the servomotor, the axle 32 is rotated to change the angle of attack of the wing 30. In an alternative embodiment, the prime mover may be human power, such as the driver's or other occupant's arms, legs or other limbs, which may apply a force to a chain, cable or lever. Alternatively, the servomotor may be housed in or adjacent the wing 30 or axle 32 to permit a driving link through a gear on the axle 32 that meshes with a gear on the servomotor's driveshaft. Still further, the axle 32 may be the servomotor's driveshaft.

In another embodiment, adjustment of the wing 30 may be effected by moving flexible cables or rigid (e.g., steel, aluminum or any other suitable material) control arms that extend from or inside the body 20 to one or more points on the wing 30 that are spaced from the axle 32. This spacing between the axle 32 and the point where force is applied forms a moment arm so that the force applied to the wing causes the wing 30 to pivot about the axle 32. A prime mover may be drivingly linked to the cables, control arms or other structures, and this construction may permit the prime mover to apply a force to the cables, control arms and/or other mechanism used to change the angle of attack of the wing 30. In an alternative embodiment, the prime mover may be an occupant of the vehicle 10, such as the driver or a passenger (not shown) using his or her arm(s) and/or leg(s) to apply a force to the cables, control arms, attached lever or other structures. Thus, any occupant of the vehicle may apply a force to modify the pitch of the wing.

It will become apparent that a human-generated or a machine-generated force may modify the position of the wing 30 to a neutral, positive or negative angle of attack. In one embodiment, the need for a change in angle may be manual, using human judgment and human force, such as by an occupant deciding, based on all he or she observes, that the angle of attack of the wing should be modified. In an alternative embodiment, a computer receives signals from sensors that detect the apparent wind speed, apparent wind direction, ground speed and possibly other parameters, and calculates an angle of attack. The computer may also actuate one or more servomotors that move the wing as a result of those signals, such as by driving a belt, chain or other flexible or rigid structure drivingly linked to the axle 32, wing 30, or both. Regardless of how a force is applied to the wing 30 or the change in angle is determined, the wing 30 is desirably movable about the axis of rotation of the axle 32 to change the angle of attack. By changing the angle of attack, the lift and drag on the vehicle 10 change, as is known in the field of aerodynamics.

The wing 30 is preferably placed on the top surface 22 of the body of the vehicle 10 far enough to the rear that any lift applied to the body 20 primarily lightens or raises the rear of the vehicle. That is, any lift that is applied to the body 20 primarily reduces the weight applied to the rear wheel 42, and provides little to no reduction of weight on the front wheels 40 and 41. In one embodiment the posts 34 are positioned directly above the rear axle. In another embodiment, the posts 34 are positioned several inches fore (toward the front) of directly above the rear axle. In another embodiment, the posts 34 are positioned several inches aft (toward the rear) of directly above the rear axle.

Figure 2:
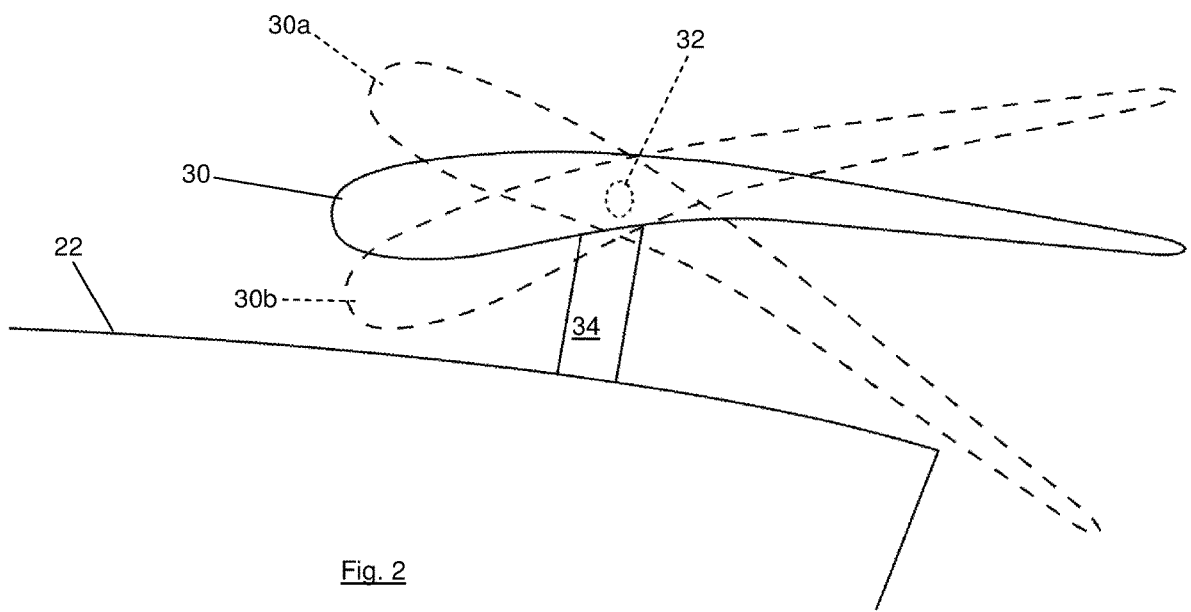
FIG. 2 is a side schematic view illustrating a magnified portion of the embodiment of FIG. 1.
Figure 3:
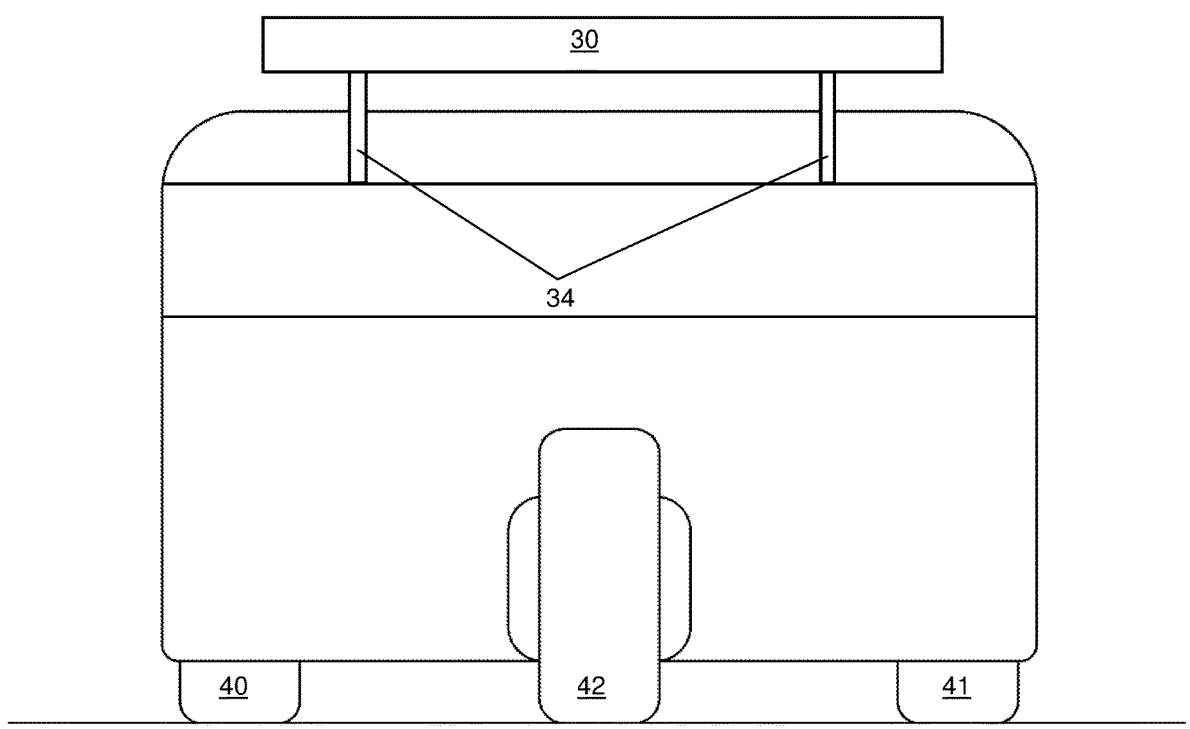
FIG. 3 is a rear schematic view illustrating the embodiment of FIG. 1.

Examples of different angles of attack of the wing 30 are shown in FIG. 2 where the wing 30 is shown in solid lines when it is essentially horizontal, i.e., with a substantially zero degree angle of attack. In the position shown in phantom and denoted as 30a, the wing has been rotated relative to vehicle 10 several degrees positively from the position shown in solid lines. This "rear down" position of the wing 30 may be preferred to slow the vehicle 10 and/or to prevent a strong tailwind from applying substantial lift to the rear of the vehicle 10 when the vehicle is at a stop or travelling at a slow speed. In the position shown in phantom and denoted as 30b, the wing has been rotated several degrees negatively relative to the position shown in solid lines. This "rear up" position of the wing 30 may be preferred to provide substantial downwardly-directed force on the vehicle under certain circumstances. One of the functions gained by the angle denoted as 30b is to apply a significant downward force on the rear of the vehicle 10. This may be in order to rapidly seat the rear wheel 42 on the surface upon which the vehicle 10 is resting if the vehicle is suspended, as described below. Alternatively, this may be to increase the downwardly-directed force of the vehicle on the ground during normal operation to increase traction or grip of the rear tire or tires. The "rear up" position denoted by 30b creates substantial drag and therefore is used only when necessary. Of course, various wing angle positions beyond and between the positions represented by reference numerals 30a and 30b are contemplated, and the positions denoted by 30a and 30b are simply to give examples. The person having ordinary skill will understand from the description herein that various other angles of attack may be achieved for various reasons.

The vehicle 10 may have two front wheels 40 and 41 that are aligned along a single axis, even though they may be mounted on separate, independent axles. Preferably at least one of the front wheels is driven by at least one prime mover, although each wheel may have its own prime mover, such as an electric, hydraulic, pneumatic or other motor. The wheel or wheels that are driven may be powered by a single prime mover, such as an internal combustion engine or electric motor, drivingly linked to the driven wheel(s) by a drive train, which may be a driveshaft, constant velocity joint, and the like. In one embodiment, a hybrid combination of internal combustion, electric, fuel cell or any prime mover may be used to drive the driven wheel(s).

The front wheels 40 and 41 mount to the body 20 by a suspension that is conventional, such as that found on a conventional front wheel drive automobile. Thus, the front wheels 40 and 41 function in a similar manner to the wheels on a conventional front wheel drive automobile, by supporting the weight of the front of the vehicle 10 and making contact with the ground 12 while also providing motive force and steering features. The front suspension of the vehicle 10 may be taken from a conventional modern automobile.

The vehicle 10 may have one non-driven rear wheel 42 for simplicity, economy and reduced wind resistance, but it is contemplated as an alternative to have more than one rear wheel. The rear wheel 42 is preferably mounted to the body 20 with a swingarm suspension member 44 that is similar to that found on the rear wheel of a conventional motorcycle, including shock absorber(s), parking brake and other modern features (not visible). The swingarm suspension member 44 mounts in a conventional, rotational manner to the rear wheel 42 and in a conventional, pivoting manner to the body 20. Shock absorbers (not shown) may extend from the body 20 to the member 44. Thus, the rear wheel 42 may roll on the ground 12 on which the vehicle 10 rests, and the rear wheel 42 is attached to the body 20 by structures that permit a smooth ride due to the rear wheel 42 and suspension absorbing the sudden impacts of the wheel 42 striking bumps and the edges of holes in the ground 12. Of course, other suspensions are contemplated, and any conventional suspension system for a single wheel may be substituted with limitations that will be understood by the person having ordinary skill.

In an alternative embodiment (not shown) two non-driven rear wheels are mounted to the body 20 in a similar manner to the rear wheels of a conventional front wheel drive automobile, with the rear wheels aligned on a single axis of rotation and aligned along longitudinal lines with the front wheels. In an alternative embodiment (not shown), two rear wheels are mounted on a single axis of rotation closer together than, and not aligned with, the front wheels 40 and 41, and are mounted using swingarm suspensions. These rear wheels may be smaller in diameter and/or width than the front wheels 40 and 41.

During use, the vehicle 10 is driven along a road, which may be a highway, with one or more occupants in the interior thereof in the same manner as a conventional automobile. This typically starts from a stop, but may begin at a low speed. Driving the vehicle 10 at low speed, which is contemplated to be less than about 50 miles per hour (mph), is similar to driving a conventional automobile, because all wheels are in contact with the road surface, which may be concrete, asphalt pavement, or any other road material. The axle 32 preferably causes the wing to be slanted with the rear down when at rest or at a slow speed to mitigate or prevent the rear of the vehicle from being raised by a strong tail wind. As the speed of the vehicle increases, the wing may be rotated (manually or automatically) to have a less positive angle of attack so that as the vehicle approaches cruise speed the wing is within a few degrees negative or positive of the angle of attack desired at cruise speed. Cruise speed is defined as the speed of the vehicle when suspended.

Figure 4:
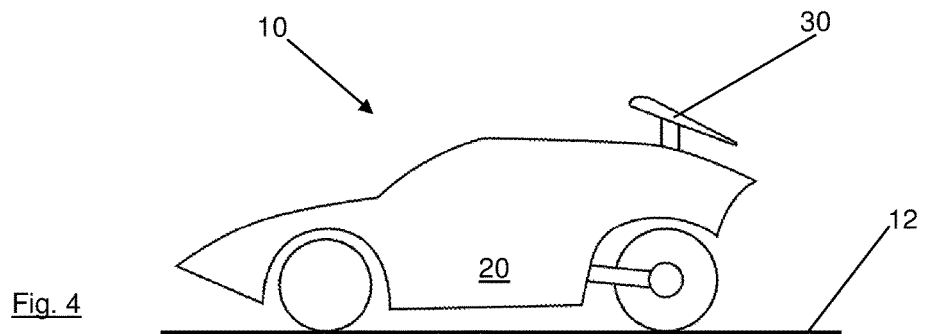
FIG. 4 is a side schematic view illustrating the embodiment of FIG. 1 in a configuration when it is travelling at a slow speed or stationary.
Figure 5:
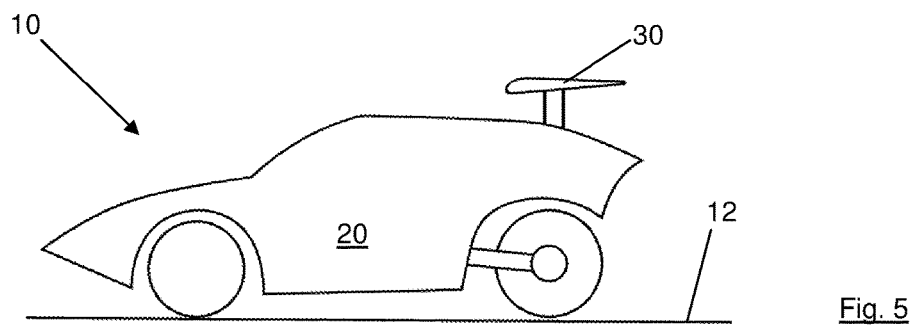
FIG. 5 is a side schematic view illustrating the embodiment of FIG. 1 at a speed sufficient to begin suspending the rear.

The wing 30 may be symmetric about a chord line of the wing 30, although in at least one embodiment the wing is asymmetric about its chord line, as shown in FIGS. 1, 2 and 4-6. As shown in FIG. 5, the wing 30 is asymmetric with a convex curvature on its upwardly facing surface and a flat or slightly convex curvature on its downwardly-facing surface. This cambered wing design will cause the air flow over the upper surface to be faster and the static pressure to be lower as compared to the lower surface, while maintaining laminar flow, thereby providing uplift when sufficient air passes over the wing as the vehicle 10 is driven in a forward direction, which is to the left in FIG. 1. The shape of the wing will be determined by known design principles in the field of aerodynamics, and engineering principles will be used to provide offsetting benefits and disadvantages, including uplift, drag, weight, cost, longevity, maintenance, and many other factors.

In a desired embodiment, the vehicle is designed so that the wing 30 provides sufficient uplift to the rear of the vehicle at sufficient speed that the rear wheel 42 (or both rear wheels in a four-wheeled vehicle) is raised above the road under the influence of the wing's lift while the front wheels maintain contact with the ground. This is a condition defined as "suspended" when it continues for an extended distance, such as about one mile, or when the wheel 42 is raised above the ground for a shorter distance than about one mile due to lift overcoming the gravitational force that would otherwise cause the wheel 42 to rest on the ground. That is, a vehicle is not suspended when a wheel separates from the ground due to striking an object that causes a rebound by the wheel and suspension system, but is suspended when a wheel separates from the ground due to lift caused by airflow over a wing. When the rear wheel 42 comes off the ground for a short distance of vehicle travel, such as when gravity is the main force acting to bring the raised wheel toward the ground, this is not a suspended condition. In a suspended condition, any wheel behind the front wheels (forward-most single axis about which two or more wheels rotate) is raised above the ground so that the rear wheel (or wheels) loses contact with the ground for an extended distance due to lift caused by an airfoil. In a preferred embodiment, when the vehicle is suspended the distance between the lowest surface of the wheel and the upper surface of the road may vary from between a fraction of an inch to more than one foot, with a contemplated distance being 2.0 to 10.0 inches, preferably about 4.0 inches. Of course, variations in road surface texture and road undulations will cause the suspended distance to vary, as will variations in lift due to cross winds, vehicles adjacent a suspended vehicle, and other causes.

Figure 6:
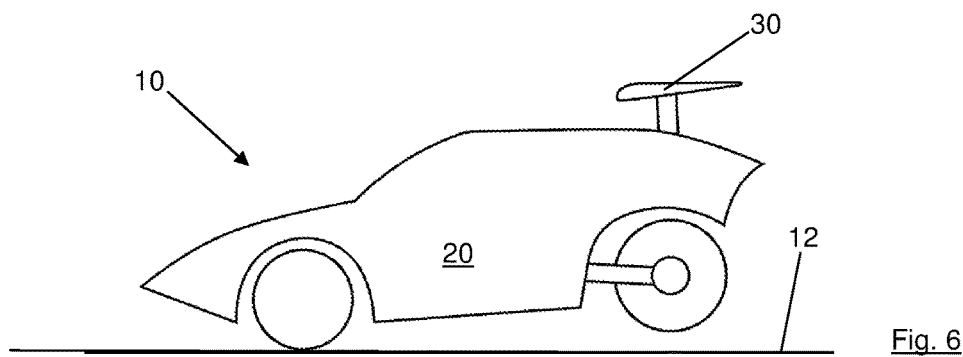
FIG. 6 is a side schematic view illustrating the embodiment of FIG. 1 at a speed sufficient to suspend the rear and cruise at that speed or higher speed.

One contemplated process of suspending the vehicle is as follows, described with reference to FIGS. 4-6. The vehicle 10 is started from a stop and accelerated to a speed slow enough that there is no substantial probability of suspension, such as 20 mph. As noted above, it may be desirable for the wing 30 to have its trailing edge down at low speeds and stops in order to prevent a tail wind from disturbing the vehicle. As the speed of the vehicle climbs, a wing with its trailing edge down may be adjusted to increase the angle of attack to increase the lift a more efficient pitch. It is also contemplated to permit the wing to rotate freely as the vehicle's speed changes, and to automatically adjust pitch as the apparent wind flows over it, such as by not applying any force to the wing 30 and permitting the air flow to adjust the pitch of the wing. Thus, the weight of the wing and the position of the wing's pivot point may result in gravity causing the "trailing edge down" position at stop and at slow vehicle speeds, whereas the trailing edge of the wing may raise as forward speed increases and fluid flow over the wing causes the wing to rotate closer to horizontal. In an alternative embodiment, the wing 30 may be substantially horizontal with an angle of attack within a few degrees of zero when the vehicle is stopped or moving at slow speeds.

Once the vehicle reaches a sufficient speed, referred to herein as "cruise speed" under desirable conditions, the angle of attack of the wing 30 is maintained or modified in order for lift to be sufficient to begin raising the rear wheel 42 off the ground, as shown in FIG. 5. With further adjustment to the angle of attack of the wing or with a further increase in vehicle speed, the lift may increase so the rear wheel 42 may be further raised to a few inches off the ground and the vehicle is suspended, as shown in FIG. 6. In this suspended condition, at least one of the front wheels continues to apply a rotational force to the road to propel the vehicle forward, and both front wheels apply a downward force so they can continue to steer the vehicle in order to follow the lane in which the vehicle is driving. The function of the front wheels continues as during conventional operation even when the rear of the vehicle is suspended.

The wing may be used as a brake, automatically and/or manually. By increasing the wing's pitch, the wing may also aid in keeping the vehicle from rotating about a vertical axis when brakes are applied, and thus the wing may provide a feature similar to a parachute that slows and stabilizes a vehicle. The use of negative pitch to push the rear wheel(s) back down when suspended, and to gain greater downwardly-directed force of the wheel against the ground, is also contemplated. The rear wheel may desirably be returned to contact with the ground for various reasons, including without limitation, to gain more control over the vehicle due to a change in conditions, to provide for safer operation, or any other reason.

The wing chord line may be horizontal when the vehicle is suspended, but this may depend on the wing design and dimensions and the vehicle weight distribution. It is desired that near zero pitch will produce sufficient lift to suspend within the preferred range of speed for suspended operation. The wing functions in a typical fashion to produce lift at the speed desired, and the wing is designed for the vehicle, after taking into consideration cargo and passengers, dimensions, overall mass, vehicle weight distribution, etc. It is anticipated that the wing for a larger vehicle will be different than a wing for a smaller, more economy-focused vehicle.

It is preferred that the wheel 42 may be forced into a compartment when the vehicle is suspended to reduce wind resistance. However, when the vehicle suspends it is contemplated that the rear wheel is not forced into a compartment or otherwise out of its normal position.

The most desirable conditions for suspension include the following. The vehicle must reach a threshold apparent wind speed at which sufficient lift for suspension is physically possible under the prevailing conditions. Furthermore, the traffic density must be low enough, and other conditions must be such, that the vehicle should desirably maintain the threshold speed required for sufficient lift. The road conditions, such as the lack of snow, ice or any other conditions, desirably do not hinder control of the vehicle with only the front wheels touching the ground. The road structure must be suitable, because too much grade, sharp curves, too many road imperfections, and other factors may cause suspending to be too risky or inefficient.

Under some conditions where suspending is physically possible, it may be undesirable. In such circumstances, it may also be desirable to pivot the wing 30 to apply a downwardly-directed force on the rear of the vehicle to maintain the vehicle with its rear wheel down firmly against the ground, such as during turns. Under other conditions, the rear wheel may be raised above the ground at slower speeds by substantially increasing the angle of attack of the wing up to 16-20 degrees beyond the normal angle of attack for suspending at higher speeds. However, this causes substantial drag, which may not be desirable.

If the conditions are desirable and the lift is sufficient, the rear wheel 42 is suspended above the road surface, which is also referred to as the ground 12. When the rear is suspended, the contact friction with the ground 12 encountered by the vehicle is lowered by the amount of friction caused by the rear wheel(s) from pre-suspended conditions. Furthermore, the ride of the vehicle is improved due to one fewer wheel to encounter road imperfections and one axle as opposed to two axles. Furthermore, the wing may absorb some of the impact encountered by the front wheels due to road imperfections.

When driving in a suspended condition, the vehicle is operated similarly to a conventional automobile. An occupant steers, applies brakes and accelerates as with a conventional automobile. However, if there is a system for monitoring conditions, that system may notify an occupant (driver and/or passenger) so he or she may manually accelerate, brake, steer a particular direction, adjust the wing or otherwise manually take action. In an alternative embodiment, the monitoring system may automatically make adjustments to the wing, brakes, steering, acceleration, and/or other controls of the vehicle using servomotors, etc.

The vehicle's smooth ride quality when suspended is substantially improved over a conventional automobile's ride, because the rear wheel of the vehicle does not strike bumps, holes or other road imperfections. Instead, the rear wheel is suspended above the road as the lift caused by the wing determines. The operator maintains the suspended condition for as long as desired or as conditions permit. If the vehicle encounters any conditions that require the vehicle to end the suspended condition, there are several actions that can rapidly bring the rear wheel 42 back into contact with the ground 12. Applying the brakes slows the vehicle, which reduces lift. Adjusting the angle of attack of the wing can force the rear wheel of the vehicle to the ground, and this can be used alone or in addition to slowing the vehicle. The wing pitch may be adjusted to make the rear of the vehicle settle gently back to the ground. This is the normal way to end suspension of the rear wheel. Alternatively, a high degree of negative pitch may be applied to the wing 30 creating negative lift and thereby causing the rear wheel to rapidly return to contact with the ground. When the vehicle ceases being suspended, it operates similarly to conventional automobiles.

Sensors and controllers may be used so that when conditions are right, the rear will lift and stay suspended. As noted above, a computer may receive signals from sensors that detect various conditions, and then the computer may actuate prime movers to pivot the wing. In an alternative embodiment, a manual system allows the driver to adjust the pitch like an elevator, a flap or other controls on an airplane, such as manually engaging or disengaging a switch or other controller, for example by flipping a toggle switch up or down. It is also contemplated to have sensors that detect changes in conditions, such as wind direction as in the case of a crosswind, and such sensors may be connected to a computer that automatically changes to adjust to the conditions, whether gradually adjusting or rapidly in an emergency.

Figure 7:
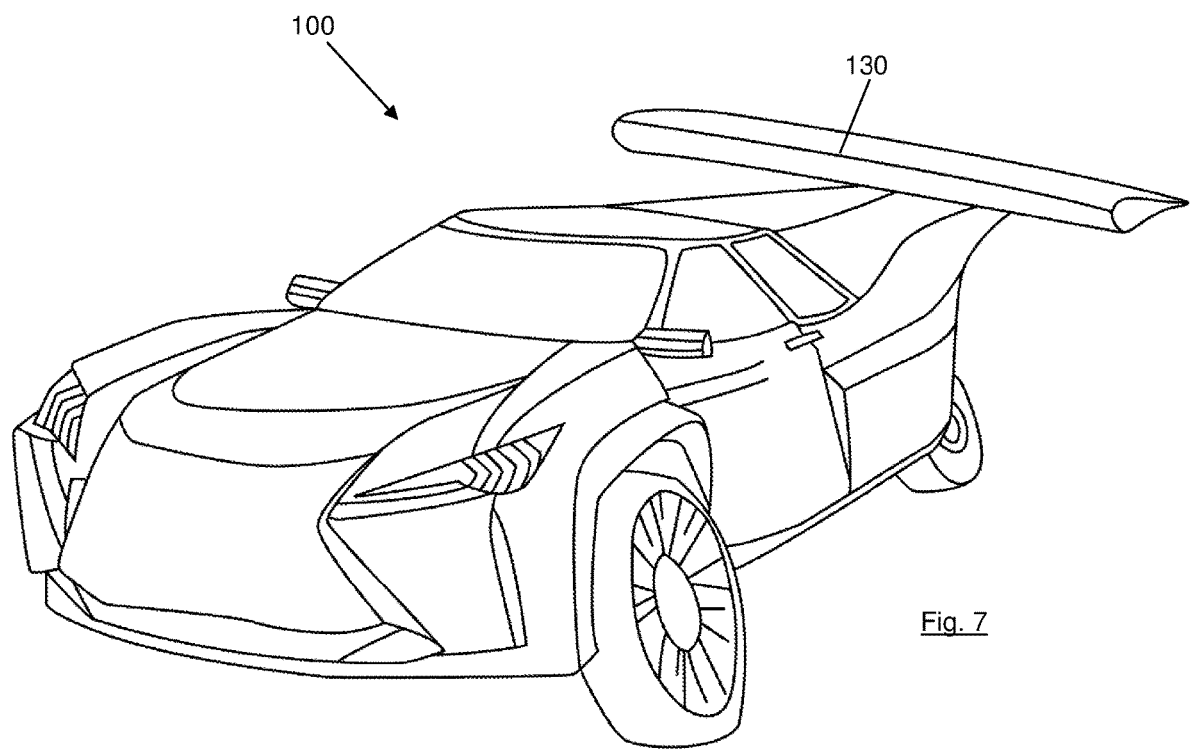
FIG. 7 is an alternative embodiment of the present invention.

An alternative embodiment of the present invention is shown in FIG. 7, which shows a wing mounted to the aft-most position on the vehicle body.

It is known in aerodynamics that, when operating on or near the ground, it is generally undesirable for a crosswind to apply a disproportionately greater force to the underside of a wing compared to the upperside. In an alternative embodiment of the present invention, shown in FIGS. 8 and 9, cables 231, 232, 233, 234 are used to connect the wing 230 to the body 220 rather than one or more rigid structures (e.g., the posts 34) as shown and described above. In this alternative embodiment, a mechanical control system automatically mitigates the effect of a crosswind, C shown in FIG. 9.

Rigid, horizontal bars 240 and 242, or other fixed barriers that may be straight or curved, are placed up to several inches toward the lateral center of the vehicle from each cable when the vehicle is suspended and not under the influence of a crossing wind. The bars 240 and 242 have lower ends mounted rigidly to the body 220 and upper ends extending upwardly about half the maximum distance the cables permit the wing 230 to extend above the body 220. Thus, when the vehicle is at cruising speed, the wing 230 is raised above the body 220 by the force of the wind passing over the wing 230, thereby causing lift on the wing and then, when the cables are taut, also on the body 220. When the wing 230 moves laterally due to a crossing wind (e.g., C in FIG. 9), the windward cable(s) 233 and 234 make contact with the adjacent bar 242 and bend across the top of the bar 242, thereby effectively decreasing the height that cables 233 and 234 can extend and causing the windward side of the wing 230 (right side in FIG. 9) to angle downwardly more than the leeward side of the wing (left side in FIG. 9) that makes no contact with its nearest barrier. In this manner, the crossing wind, C, may have less disruptive effect to the handling and the intended course of the vehicle.

Figure 9:
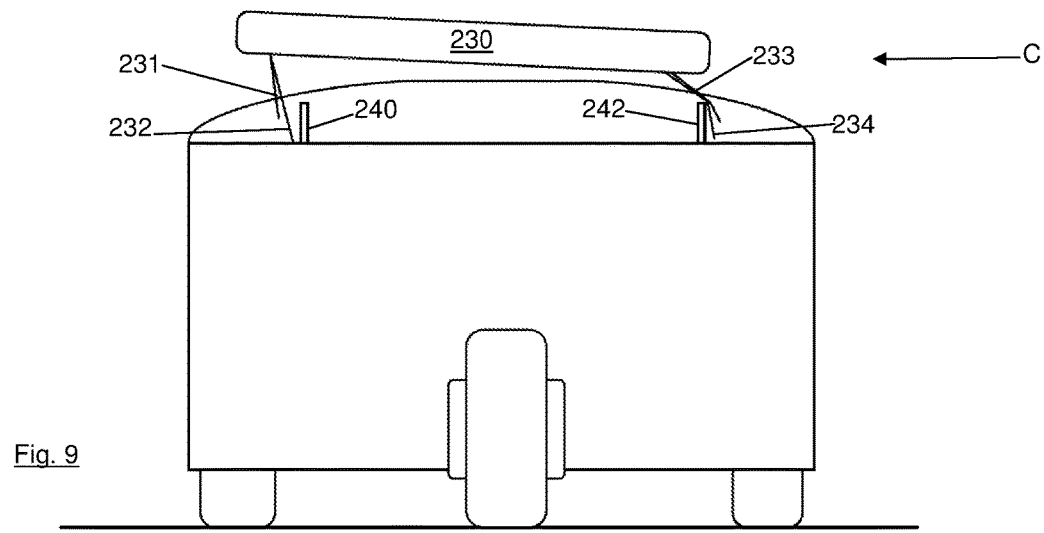
FIG. 9 is a rear schematic view illustrating the embodiment of FIG. 8 with the wing displaced from its position in FIG. 8.

In an alternative embodiment, rather than fixed barriers placed laterally inside each of the cables that connect the wing to the body, an attachment to each cable (at approximately the same position that would have made contact with a fixed barrier) to a flexible or rigid connector that attaches to a laterally exterior part of the body will similarly alter the windward cable's motion. In the example of FIG. 9 with a crossing wind, C, from the right, a cable extending from the right to about midway along the length of the cables 233 and 234 would cause the cables to bend similarly to the bar 242. This will affect the windward side of the wing by restricting lateral motion and increasing downward motion of the right side of the wing.

Figure 8:
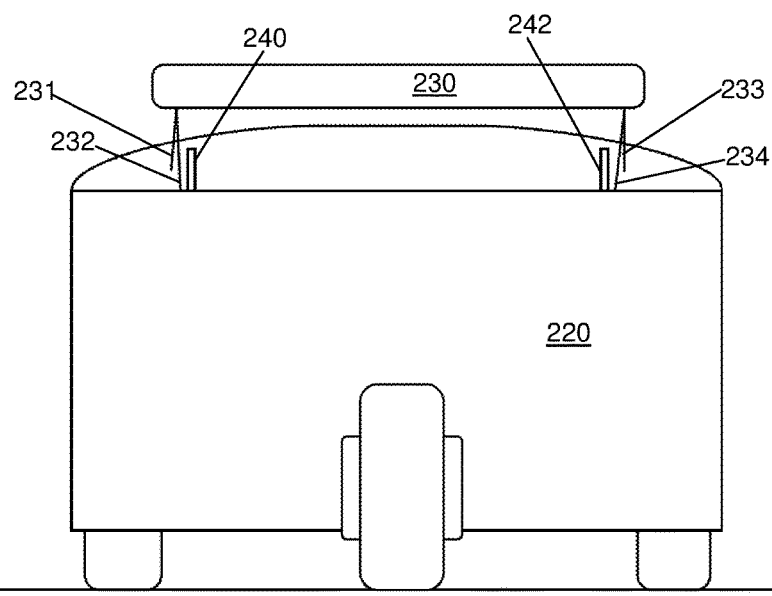
FIG. 8 is a rear schematic view illustrating an embodiment of the present invention.

In another alternative to the cables shown in FIGS. 8 and 9, the cables could be replaced by rigid members that extend along the same paths as the cables 231-234, if such rigid members have single-folding hinges about halfway along their lengths. By folding in only the laterally-inward direction, upon a strong crossing wind, C, from the right, the folding members on the right side would fold laterally inwardly and cause the wing to tilt downwardly on the right side as shown in FIG. 9. A crossing wind in the opposite direction would cause opposite tilt, thereby preventing or mitigating an upward force applied to the lower surface of the wing 230 due to a crosswind effect.

The preferred wing design is asymmetrical due to its ability to produce higher lift over a broad range of angles of incidence compared to a symmetrical wing.

Figure 10:
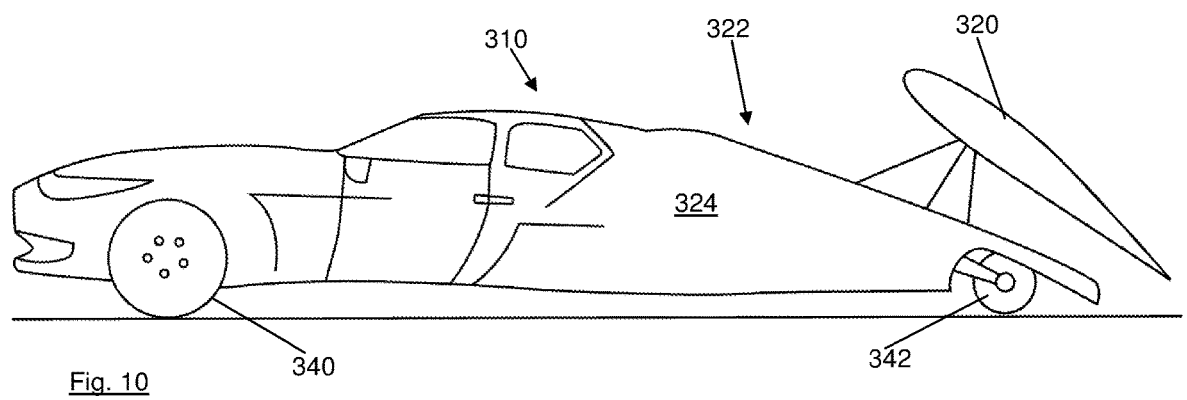
FIG. 10 is a side view illustrating an embodiment of the present invention.
Figure 11:
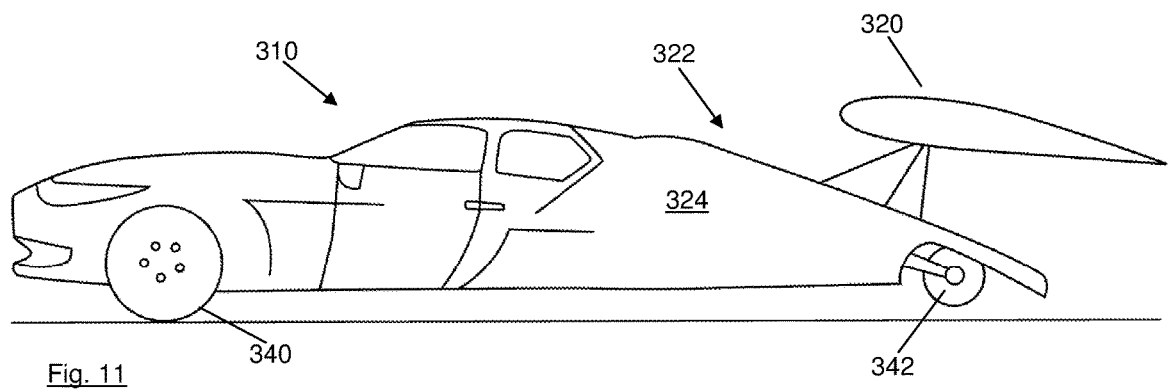
FIG. 11 is a side view illustrating the embodiment of FIG. 10.

In an alternative embodiment of the present invention, as shown in FIGS. 10 and 11, the vehicle 310 has a body 324 with an upper surface 322 to which a wing 320 is mounted. The front wheels 340 and 341 (341 not visible in FIGS. 10 and 11) contact the road surface at all times, and the rear wheel 342 contacts the road surface at all times except when suspended, as described above. In FIG. 10, the vehicle 310 is shown at a stop or a slow speed, such that the wing 320 is in a trailing edge down position to prevent a rear wind from raising the rear of the vehicle. In FIG. 11, the vehicle is shown suspended.

In FIG. 12, the controls for the wing 320 are shown. A structure 360 is rigidly mounted to the rods 370 and 380 that mount to the body 324. The wing 320 seats against the structure 360 to prevent the wing from contacting the body 324. The wing is pivotably mounted to the rods 370 and 380, and is pivoted about the axis of rotation (not shown, but similar to the axle 32) by the control members 390 and 392. Each of the control members 390 and 392 mounts to the wing 320 a substantial distance from the axis of rotation of the wing 320, and is actuated to move toward and away from the wing 320 by a prime mover, thereby pivoting the wing 320. The control members 390 and 392 may be cables that extend into the body 324 to servomotors with pulleys on their driveshafts around which the cables extend. Upon actuation of the servomotors, the wing 320 may be pivoted.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A vehicle comprising:
   (a) a vehicle body configured to receive at least one person;
   (b) at least two front wheels rotatably mounted to the body about a front axis of rotation, the at least two front wheels having road-receiving circumferential surfaces, wherein at least one of the at least two front wheels is drivingly linked to a prime mover that is configured to propel the vehicle along a road;
   (c) at least one rear wheel rotatably mounted to the body about a rear axis of rotation, the rear wheel having a road-receiving circumferential surface;
   (d) an airfoil mounted to the body above the at least one rear wheel at an angle of attack and configured for modification of the angle of attack to create sufficient lift on the body at a vehicle cruise speed to cause the road-receiving circumferential surface of the rear wheel to separate from the road, while the road-receiving circumferential surfaces of the at least two front wheels maintain contact with the road.

2. The vehicle in accordance with claim 1, wherein the at least one rear wheel comprises two rear wheels.

3. The vehicle in accordance with claim 1, wherein the airfoil is mounted near the most aft position on the body at a height that when the rear wheel is suspended the airfoil is positioned in a range between about three inches and about twenty inches higher than a highest surface of the vehicle body.

4. The vehicle in accordance with claim 1, wherein the airfoil is mounted above a top of a vehicle body roof a distance in a range between about three inches and about twenty inches.

5. A method of operating a vehicle having a body configured to receive at least one person, the body having a roof, the method comprising:
   (a) resting road-receiving circumferential surfaces of at least two front wheels, which front wheels are rotatably mounted to the body about a front axis of rotation, on a road;
   (b) placing in contact with the road a road-receiving circumferential surface of at least one rear wheel that is rotatably mounted to the body about a rear axis of rotation;
   (c) applying torque to at least one of the at least two front wheels until the vehicle attains a cruise velocity; and
   (d) adjusting an angle of attack of an airfoil mounted to the body above the at least one rear wheel to increase lift applied by the airfoil to the body sufficient to cause the road-receiving circumferential surface of the rear wheel to separate from the road while the road-receiving circumferential surfaces of the at least two front wheels maintain contact with the road.

6. The method in accordance with claim 5, wherein the step of adjusting an angle further comprises adjusting the airfoil angle of attack in a range between about 60 degrees positive and about 40 degrees negative.

7. The method in accordance with claim 5, further comprising a step of maintaining the angle of attack of the airfoil in a range between about 60 degrees positive and about 40 degrees negative.

8. A vehicle having an enclosed body configured to receive at least one person, the body having a roof and at least two front wheels rotatably mounted to the body about a front axis of rotation, the at least two front wheels having road-receiving circumferential surfaces and at least one of the at least two front wheels is drivingly linked to a prime mover that is configured to propel the vehicle along a road, the vehicle comprising:
   (a) at least one rear wheel rotatably mounted to the body about a rear axis of rotation, the rear wheel having a road-receiving circumferential surface; and
   (b) an airfoil horizontally and pivotably mounted to the body above the at least one rear wheel, the airfoil having an angle of attack; and
   (c) means for pivoting the airfoil to modify the angle of attack to create sufficient lift on the body at a vehicle cruise speed to cause the road-receiving circumferential surface of the rear wheel to separate from the road, while the road-receiving circumferential surfaces of the at least two front wheels maintain contact with the road.

9. The vehicle in accordance with claim 8, wherein the airfoil has an aerodynamic center, and the airfoil is pivotably mounted on or near the aerodynamic center.

10. A method of operating a vehicle having a body configured to receive at least one person, the method comprising:
    (a) resting road-receiving circumferential surfaces of at least two front wheels, which front wheels are rotatably mounted to the body about a front axis of rotation, on a road;
    (b) placing in contact with the road a road-receiving circumferential surface of at least one rear wheel that is rotatably mounted to the body about a rear axis of rotation;
    (c) applying torque to at least one of the at least two front wheels until the vehicle attains a cruise velocity; and
    (d) adjusting an angle of attack of an airfoil mounted to the body above the at least one rear wheel to increase lift applied by the airfoil to the body sufficient to cause the road-receiving circumferential surface of the rear wheel to separate from the road while the road-receiving circumferential surfaces of the at least two front wheels maintain contact with the road.

11. The method in accordance with claim 10, further comprising a step of adjusting an angle of attack of the airfoil mounted to the body above the at least one rear wheel to apply downforce by the airfoil to the body sufficient to cause the road-receiving circumferential surface of the rear wheel to contact the road to increase vehicle control.

12. The method in accordance with claim 10, wherein the step of adjusting an angle further comprises adjusting the airfoil angle of attack in a range between about 60 degrees positive and about 40 degrees negative.

13. The method in accordance with claim 10, further comprising a step of maintaining the angle of attack of the airfoil in a range between about 60 degrees positive and about 40 degrees negative.

14. The method in accordance with claim 5, further comprising a step of adjusting an angle of attack of the airfoil mounted to the body above the at least one rear wheel to apply downforce by the airfoil to the body sufficient to cause the road-receiving circumferential surface of the rear wheel to contact the road to increase vehicle control.

\* \* \* \* \*